United States Patent
Fitzgibbon et al.

(10) Patent No.: US 10,880,526 B2
(45) Date of Patent: Dec. 29, 2020

(54) SECURITY APPARATUS AND METHOD

(71) Applicant: The Chamberlain Group, Inc., Elmhurst, IL (US)

(72) Inventors: James J. Fitzgibbon, Batavia, IL (US); Jonathan Arnold Lee, LaGrange, IL (US); Brian Roy Skotty, Elmhurst, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 675 days.

(21) Appl. No.: 14/868,924

(22) Filed: Sep. 29, 2015

(65) Prior Publication Data
US 2016/0093180 A1    Mar. 31, 2016

Related U.S. Application Data (60) Provisional application No. 62/057,917, filed on Sep. 30, 2014.

(51) Int. Cl.
| | |
|---|---|
| *H04N 5/232* | (2006.01) |
| *H04N 7/18* | (2006.01) |
| *G08B 13/196* | (2006.01) |
| *G06K 9/00* | (2006.01) |

(52) U.S. Cl.
CPC ......... *H04N 7/188* (2013.01); *G08B 13/1966* (2013.01); *G08B 13/19684* (2013.01); *G08B 13/19695* (2013.01); *G06K 9/00771* (2013.01); *H04N 7/183* (2013.01)

(58) Field of Classification Search
CPC .......... G08B 13/1966; G08B 13/19684; G08B 13/19695; H04N 7/188; H04N 7/183; G06K 9/00771
See application file for complete search history.

(56) References Cited

U.S. PATENT DOCUMENTS

| | | |
|---|---|---|
| 4,360,807 A | 11/1982 | Lettergren |
| 4,464,651 A | 8/1984 | Duhame |
| 5,864,134 A | 1/1999 | Burgess |
| 6,025,785 A | 2/2000 | Farris |

(Continued)

OTHER PUBLICATIONS

International Search Report and Written Opinion dated Dec. 22, 2015 in PCT Patent Application No. PCT/US2015/052934.

(Continued)

*Primary Examiner* — Peet Dhillon
(74) *Attorney, Agent, or Firm* — Fitch, Even, Tabin & Flannery LLP (57) ABSTRACT

A security system notifies a user of a security event when a movable barrier operator light turns on. The security system includes a camera in communication with control circuitry and a communication module. The control circuitry is configured to control operation of the camera. The communication module communicates with a light status detector that determines the status of an operator light associated with a movable barrier operator. When the operator light turns on, the light status detector sends a signal to the communication module, effecting the control circuitry to operate the camera to capture security data. The communication module then transmits the captured security data over a network to be accessible by a mobile device.

25 Claims, 8 Drawing Sheets

(56) References Cited

U.S. PATENT DOCUMENTS

| | | | |
|---|---|---|---|
| 6,057,776 A * | 5/2000 | Sargent | H01R 25/006 340/545.1 |
| 6,535,243 B1 | 3/2003 | Tullis | |
| 7,113,090 B1 | 9/2006 | Saylor | |
| 7,193,644 B2 | 3/2007 | Carter | |
| 7,205,892 B2 | 4/2007 | Luebke | |
| 7,468,676 B2 | 12/2008 | Styers | |
| 7,532,709 B2 | 5/2009 | Styers | |
| 7,602,283 B2 | 10/2009 | John | |
| 7,710,284 B2 | 5/2010 | Dzurko | |
| 7,869,582 B2 | 1/2011 | Styers | |
| 8,026,946 B2 | 9/2011 | Nassimi | |
| 8,139,098 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 8,218,739 B2 | 7/2012 | Styers | |
| 8,345,846 B2 | 1/2013 | Nassimi | |
| 8,410,930 B2 | 4/2013 | Karasek | |
| 8,780,201 B1 | 7/2014 | Scalisi | |
| D711,275 S | 8/2014 | Scalisi | |
| 8,823,795 B1 | 9/2014 | Scalisi | |
| 8,842,180 B1 | 9/2014 | Kasmir | |
| 8,872,915 B1 | 10/2014 | Scalisi | |
| 8,937,659 B1 | 1/2015 | Scalisi | |
| 9,756,233 B2 | 9/2017 | Lee | |
| 2001/0001561 A1 | 5/2001 | Coles | |
| 2002/0099945 A1 | 7/2002 | McLintock | |
| 2002/0183031 A1 | 12/2002 | Yamagishi | |
| 2002/0189842 A1 * | 12/2002 | Burke | G08B 13/1445 174/72 A |
| 2003/0025470 A1 * | 2/2003 | Fitzgibbon | H02H 7/0851 318/66 |
| 2003/0071590 A1 | 4/2003 | Roman | |
| 2003/0095185 A1 | 5/2003 | Naifeh | |
| 2003/0140107 A1 | 7/2003 | Rezvani | |
| 2004/0095254 A1 | 5/2004 | Maruszczak | |
| 2004/0212498 A1 | 10/2004 | Peterson | |
| 2004/0243812 A1 | 12/2004 | Yui | |
| 2005/0007451 A1 | 1/2005 | Chiang | |
| 2005/0253544 A1 * | 11/2005 | Fitzgbbon | G05B 9/02 318/434 |
| 2006/0015398 A1 | 1/2006 | Weik | |
| 2006/0082454 A1 | 4/2006 | Fukuda | |
| 2006/0156361 A1 | 7/2006 | Wang | |
| 2006/0187034 A1 * | 8/2006 | Styers | G08B 13/19656 340/545.1 |
| 2006/0255931 A1 | 11/2006 | Hartsfield | |
| 2007/0103541 A1 | 5/2007 | Carter | |
| 2007/0103542 A1 | 5/2007 | Carter | |
| 2007/0103548 A1 | 5/2007 | Carter | |
| 2008/0062000 A1 | 3/2008 | Styers | |
| 2008/0079562 A1 | 4/2008 | Gioia | |
| 2008/0079810 A1 * | 4/2008 | Fitzgibbon | B66B 13/24 348/152 |
| 2008/0117299 A1 | 5/2008 | Carter | |
| 2010/0289661 A1 * | 11/2010 | Styers | G05B 9/02 340/686.1 |
| 2011/0234367 A1 * | 9/2011 | Murphy | G05B 19/042 340/3.7 |
| 2011/0250845 A1 * | 10/2011 | Chutorash | G07C 9/00896 455/66.1 |
| 2011/0254685 A1 | 10/2011 | Karasek | |
| 2012/0262581 A1 | 10/2012 | Carter | |
| 2013/0057695 A1 | 3/2013 | Huisking | |
| 2014/0118111 A1 | 5/2014 | Saladin | |
| 2014/0125499 A1 | 5/2014 | Cate | |
| 2014/0266593 A1 * | 9/2014 | Nye | G07C 9/00126 340/5.71 |
| 2015/0029335 A1 | 1/2015 | Kasmir | |
| 2015/0222852 A1 | 8/2015 | Carter | |

OTHER PUBLICATIONS

PCT Application No. PCT/US15/22742; International Search Report and Written Opinion dated Jul. 10, 2015.

* cited by examiner

SECURITY APPARATUS AND METHOD

CROSS-REFERENCE TO RELATED APPLICATION

This application claims the benefit of U.S. Provisional Application No. 62/057,917, titled GARAGE VIDEO MONITORING, filed Sep. 30, 2014, which is incorporated by reference in its entirety herein.

TECHNICAL FIELD

The present disclosure generally relates to security systems. More specifically, the present disclosure relates to a system triggered by a movable barrier operator to monitor security within a building.

BACKGROUND

Garages are vulnerable to break-ins and other security breaches. This can be of a particular concern when the entrance to the garage is operated by a motorized barrier or door. Detecting the presence of individuals in or around a garage or detecting when a door to the garage has been opened can help notify a user when a potential break-in or other security threat is occurring.

SUMMARY

The present disclosure describes examples of a security system configured to operate in connection with a movable barrier (e.g., a garage door) operator. The security system is configured to notify a user of a security event when it detects that an operator light associated with the movable barrier operator has been turned on (or at least attempted to be turned on). The present disclosure provides examples of movable barrier operators, security systems, their related components, and methods for making, installing, and using the same.

In one example, a movable barrier includes a movable barrier operator. The movable barrier operator has an operator light that is configured to turn on in response to the occurrence or detection of certain events. For example, the movable barrier operator light may be configured to turn on in response to the movable barrier operator's opening, closing, or otherwise moving the barrier (or attempting to open/close/move the barrier), the detection of an object moving within a building/garage (e.g., via a motion detector), or the detection of an object entering or leaving a building/garage (e.g., via an interrupted safety beam). A security system is configured to be installed with respect to the movable barrier operator. The security system includes a light status detector that monitors the status of the operator light. The system also includes a camera that obtains security data, including images, video, and/or audio. The system also includes a communication module, such as a wireless transceiver, that communicates with the light status detector and the camera. Control circuitry communicates with the camera and the communication module, and can control the operation of the camera.

In one example of operation, the security system (e.g., through the control circuitry) controls the camera to capture security data when it is detected that the operator light is on, has been turned on, or has been attempted to be turned on. The communication module transmits the security data obtained by the camera to a mobile device, for example, via a network such as the internet. For instance, when the light status detector determines that the operator light has turned on, the control circuitry controls the camera to capture security data, and the communication module transmits that security data to a mobile device, such as a networked storage device, a smart phone, a tablet computer, a notebook computer, or another wireless communication device.

BRIEF DESCRIPTION OF THE DRAWINGS

The attached figures depict diagrams and images of components of a security system in accordance with at least one example of the present disclosure.

DETAILED DESCRIPTION

The present disclosure describes examples of a barrier operator light-based security system 100 ("the security system," or simply "the system") that transmits a notification to a user in response to a movable barrier operator light turning on. The security system utilizes a light status detector to detect when the operator light turns on (or, at least, was intended to be turned on) for a number of reasons. For example, the light status detector may detect that an operator light turns on as a result of the barrier operator's opening, closing, or otherwise moving a barrier, when a motion detector detects motion in proximity of the barrier (e.g., within a garage), or when a safety beam generated between sensors installed about an entryway is broken. When the light status detector detects that the operator light has turned on, the security system operates a camera to record security data, and then transmits that security data to a remote or mobile device, such as a smart phone, tablet computer, laptop computer, other wireless communication device.

As used throughout this application, the term "security data" refers to information that can be captured by a camera, such as image files, video files, audio files, and/or combinations thereof. However, it should be understood that security data can also include other information capable of being captured by a camera or other devices, including date and time information (e.g., time stamps), camera identifiers or other location information (e.g., location stamps), and other relevant obtainable information. It is also considered that "security data" can include other information that may be relevant to a security system in addition to and/or instead of the image, video and/or audio files typically associated with cameras. For example, security data can include information captured from various sensors, including temperature information, smoke level information, information on the levels of carbon monoxide or other toxins in an area, information from motion sensors, glass break sensors, broken beam sensors, forced entry sensors, or the like. Such information could be included along with image/video/audio files captured by a camera (e.g., as metadata or a stamp associated with the files), or as separate data files.

Figure 1:
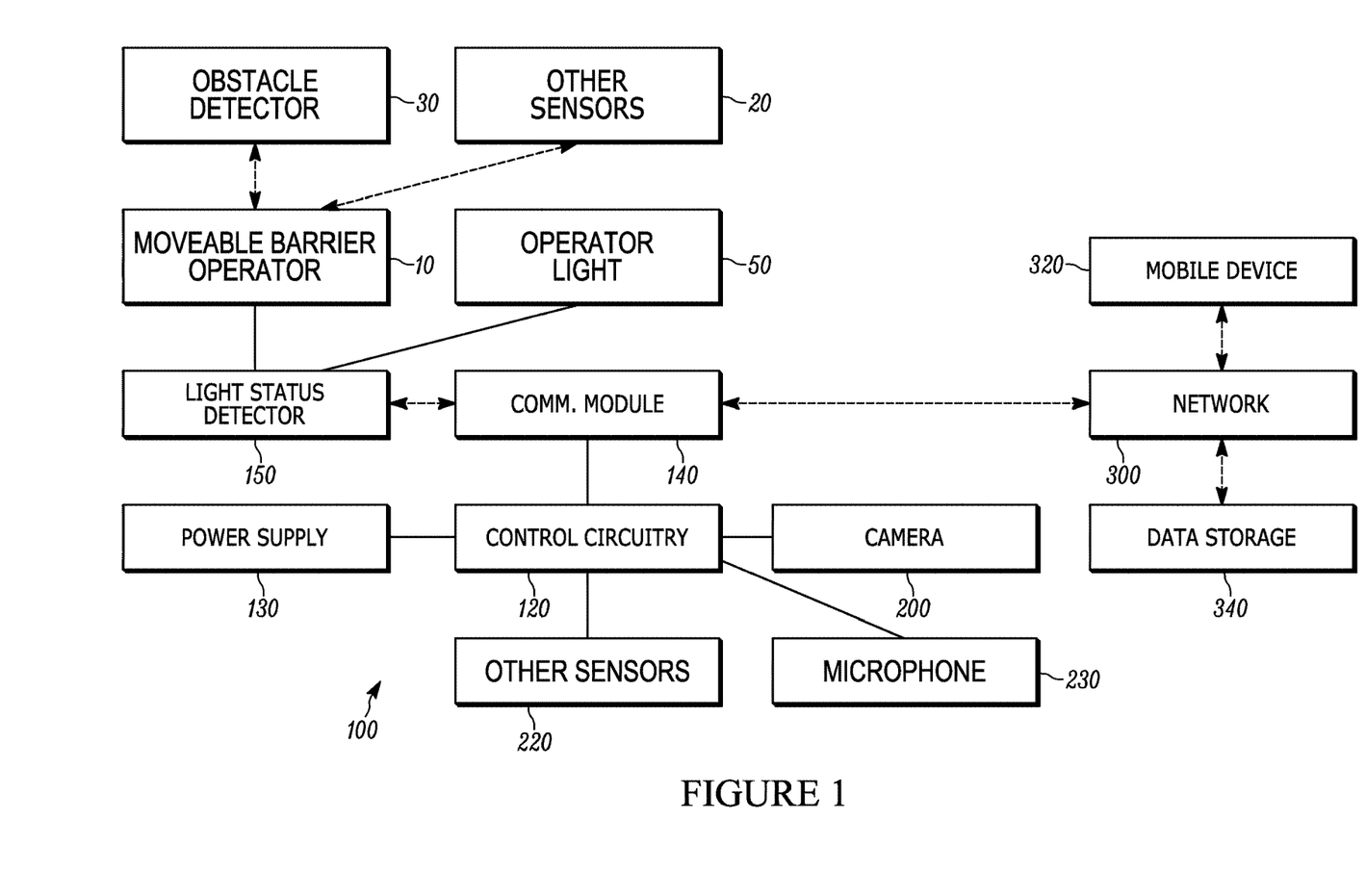
FIG. 1 is a block diagram showing the interaction among various components associated with an operator-light-based security system in accordance with at least one embodiment described herein.

FIG. 1 is a block diagram showing the interaction among various components associated with an example security system 100. In some examples, the security system 100 includes a camera 200, a light status detector 150, control circuitry 120, and a communication module 140.

The security system 100 can also include a power supply 130 that supplies power to the system. The power supply 130 can include a power adaptor (e.g., an AC power adaptor), a battery, a power cord, or other apparatus configured to supply the security system 100 with electrical power.

In some embodiments, certain components of the security system 100 may be integrated into the power supply 130. For example, the control circuitry 120 and the communication module 140 may be integrated into the power supply device 140 and connected via a wired connection to the camera 200. In this manner, the power supply 130 can provide electrical power to each of the control circuitry 120, the communication module 140, the camera 200, a microphone 230, and other sensors 220 (e.g., temperature sensors, smoke or carbon monoxide detectors, motion sensors, glass-break sensors, etc.).

In other examples, the camera 200 may have a separate power supply and therefore communicate with the system 100 via a wireless communication methodology. In still other examples, the light status detector 150 can be integrated into the power supply, for example, as a light sensor or other similar feature. In some aspects, the power supply 130 can provide electrical power to the light status detector 150, for example, through a wired connection, but in other aspects, the light status detector 150 can have a separate power supply.

The security system 100 may include some or all of the components depicted in FIG. 1. For example, in some embodiments, the system 100 itself includes the light status detector 150, the power supply 130, control circuitry 120, the communication module 140, and the camera 200. Such a system is configured to operate in connection with a movable barrier operator 10, and an operator light 50. That is, the system 100 can be a retro-fit system 100 or kit designed to operate with a pre-existing or previously installed movable barrier operator 10 with an operator light 50. In this manner, a user can install a retro-fit in a pre-existing movable barrier operator that has neither wireless communication nor camera operation capabilities.

In other examples, however, the system 100 may include the movable barrier operator 10 and operator light 50. That is, the security system 100 may be a movable barrier operator system that integrates the light status detector 150, camera 200, control circuitry, 120 and communication module 140 into the movable barrier operator 10.

The movable barrier operator 10 may include, or operate in connection with, an obstacle detector 30. The obstacle detector 30 may employ a safety beam sensor or other similar approach to determine whether a threshold monitored by the obstacle detector 30 has been breached, traversed, or otherwise crossed. The obstacle detector 30 may employ safety beam sensors about a building entryway (e.g., a garage entryway) to determine if an obstacle is within the path of the movable barrier. In another approach, the obstacle detector 30 may employ time of flight techniques to determine if a threshold has been breached or crossed. The movable barrier operator 10 may further include, or operate in connection with, various other sensors 20 or detectors, which may include, for example, motion sensors, temperature sensors, noise sensors (e.g., glass-break sensors), smoke detectors, carbon monoxide or other toxin detectors, barrier movement detectors, or the like.

The security system 100 receives power from a power supply 130, which can be, for example, an AC power adaptor configured to plug into a 120 V electrical outlet (e.g., in a wall or ceiling). The power supply 130 can also provide power to the communication module 140 and to the camera 200. For instance, the power supply 130 can provide electrical power to the camera 200 via a wired connection that can include a cord or cable. In some embodiments, the control circuitry and communication module 140 can be integrated into the power supply 130 such that the power supply 130 itself is a power adapter equipped with control and communication functionality.

The light status detector 150 is configured to detect and/or determine when an operator light 50 of a movable barrier operator 10 has turned on or was intended to be turned on (e.g., the movable barrier operator 10 attempted to turn on the operator light 50 but failed because the operator light 50 was burned out). The light status detector 150 can be a light sensor that detects the presence of light. In such an embodiment, the light status detector 150 can be configured, positioned, and otherwise arranged to detect when the operator light 50 goes from off to on.

In another embodiment, the light status detector 150 is in communication with the movable barrier operator 10 and/or the operator light 50. For example, the light status detector 150 can be a socket relay that installs into a socket in the movable barrier operator 10 and receives the operator light 50 within a socket in the light status detector 150. In this configuration, the socket relay receives electrical power from the movable barrier operator 10 through the socket, and in turn, delivers electrical power to the operator light 50.

So configured, the light status detector 150 can determine when the operator light 50 has been turned on (or has been intended to be turned on) by monitoring the delivery of power through the movable barrier operator 10 socket. For example, when the light status detector 150 detects that the movable barrier operator 10 has turned on power to deliver to the operator light 50, it will determine that the operator light 50 has turned on and transmit a signal to the system 100 (e.g., to the communication module 140 and/or the control circuitry 120) accordingly. By this approach, the security system 100 can be installed as a retro-fit system in a pre-existing movable barrier operator 10. Such a system will provide remote communication capabilities with a mobile device (e.g., through the communication module 140), and security camera capabilities even where the pre-existing movable barrier operator itself is not equipped with any advanced features.

The control circuitry 120 can be configured to control operation of the camera 200. For example, the control circuitry is configured to send instructions to the camera that effect the capture of security data, including images, video, audio, and/or combinations thereof. The control circuitry 120 can also be configured to adjust the position, orientation, pan, tilt, focus, zoom, sensitivity, lighting level (e.g., flash), and image quality of the camera 200, as well as other features typically associated with cameras.

In some examples, the control circuitry 120 will be directly wired to the camera 200 and therefore communicate via such a wired connection. In other examples, as described above, the camera 200 will be untethered from the control circuitry 120 and other components of the system 100. In such an untethered configuration, the control circuitry 120 will control operation of the camera 200 by transmitting signals wirelessly via the communication module 140 or other transmitter.

In some forms, the communication module 140 is configured to communicate with a network 300 via a wired or wireless communication protocol. For example, the communication module 140 can transmit and/or upload security data captured by the camera 200 to the network 300 via a wireless signal (e.g., Wi-Fi, radio signals, Bluetooth, etc.). The communication module 140 can include a wireless transceiver configured to send and receive communications over the network and with other components including, for example, the light status detector 150, the camera 200, and the movable barrier operator 10.

In some embodiments, the communication module 140 communicates with the network 300 via a wireless network router or other networking device. Via the network 300, the communication module 140 can access the internet or other networks that facilitate communication with a variety of other communication devices. For example, through the network 300, the communication module 140 may be able to access a data storage system 340, which can be a memory device on a remote computing device, a cloud-based storage account, or the like. In this manner, security data captured by the camera 200 can be uploaded to the data storage system 340 for access by a user at a later time or even immediately thereafter.

The communication device 140 may also be able to communicate directly with a mobile device 320 via the network 300. For example, through the network 300, the communication module may be able to communicate with a smart phone, a tablet computer, a laptop computer, other portable wireless devices, or even non-portable wired computing equipment (e.g., a home computer or home video surveillance system).

In some aspects, the communication module 140 can be configured to send notifications and other communications to the mobile device 320 through the network 300. In response to receiving such notifications or communications, the mobile device 320 (e.g., via a mobile application operated by the device 320) may be able to access information on the data storage system 340 through the network 300.

In other examples, the communication module 140 may be configured to send security data directly to a mobile device 320 so that, upon capturing security data by the camera 200, the communication module 140 transmits the captured security data to the mobile device 320. In this manner a user may be able to view the security data and interact with the system 100 in real-time.

Figure 2:
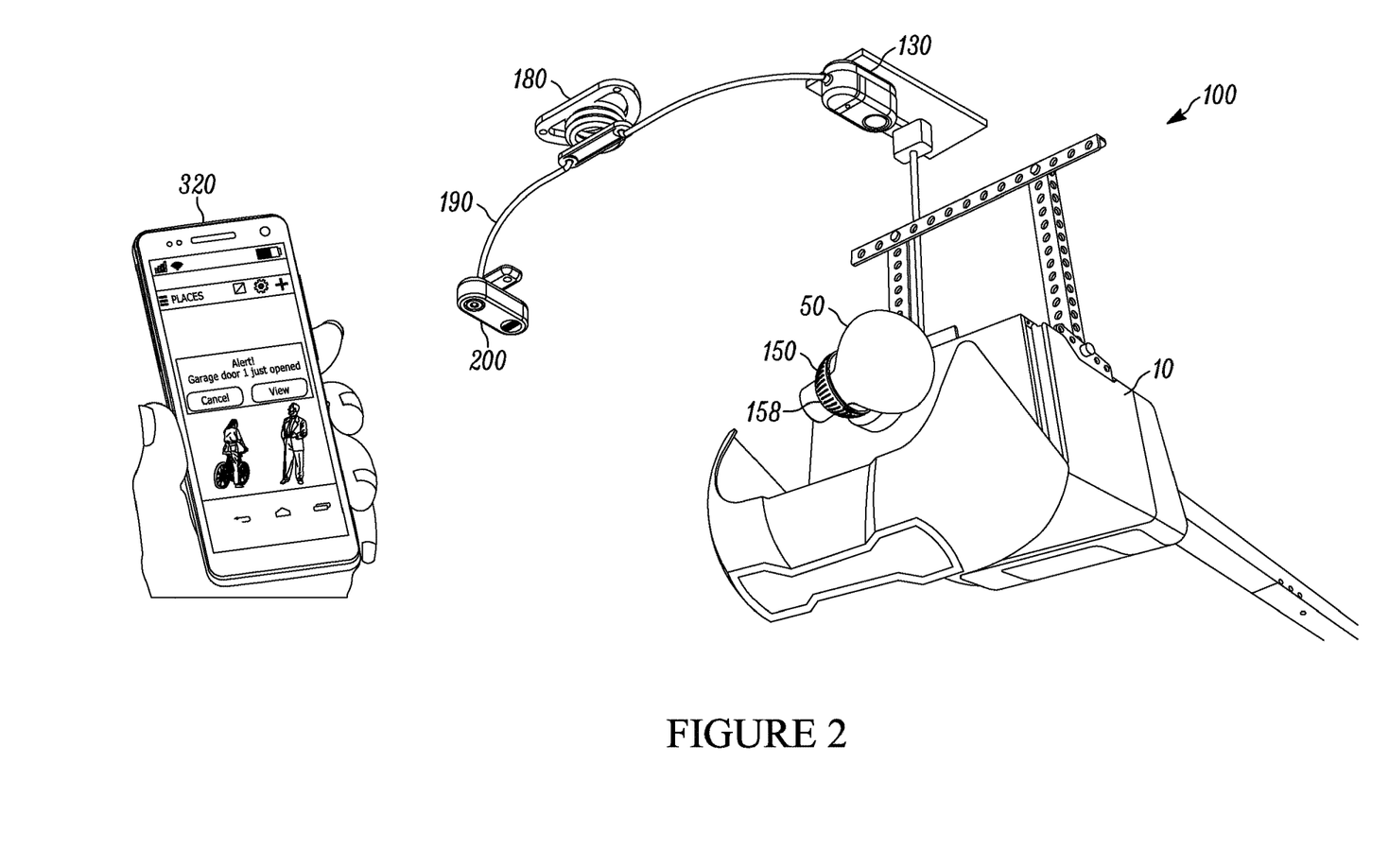
FIG. 2 is a diagram showing an example of an operator-light-based security system installed with respect to a movable barrier operator and in communication with a mobile device in accordance with at least one embodiment described herein.

Some examples of the security system 100 include, or operate in connection with, a movable barrier operator 10 installed in a building or structure. FIG. 2 shows an example of a security system 100 installed to operate in connection with a movable barrier operator 10. The security system 100 includes a camera 200, shown mounted on the ceiling of a garage, a power supply 130 plugged into an AC outlet, a cable manager 180 mounted to the ceiling of the garage, and a light status detector 150 installed in an operating light socket of a movable barrier operator 10.

Figure 3:
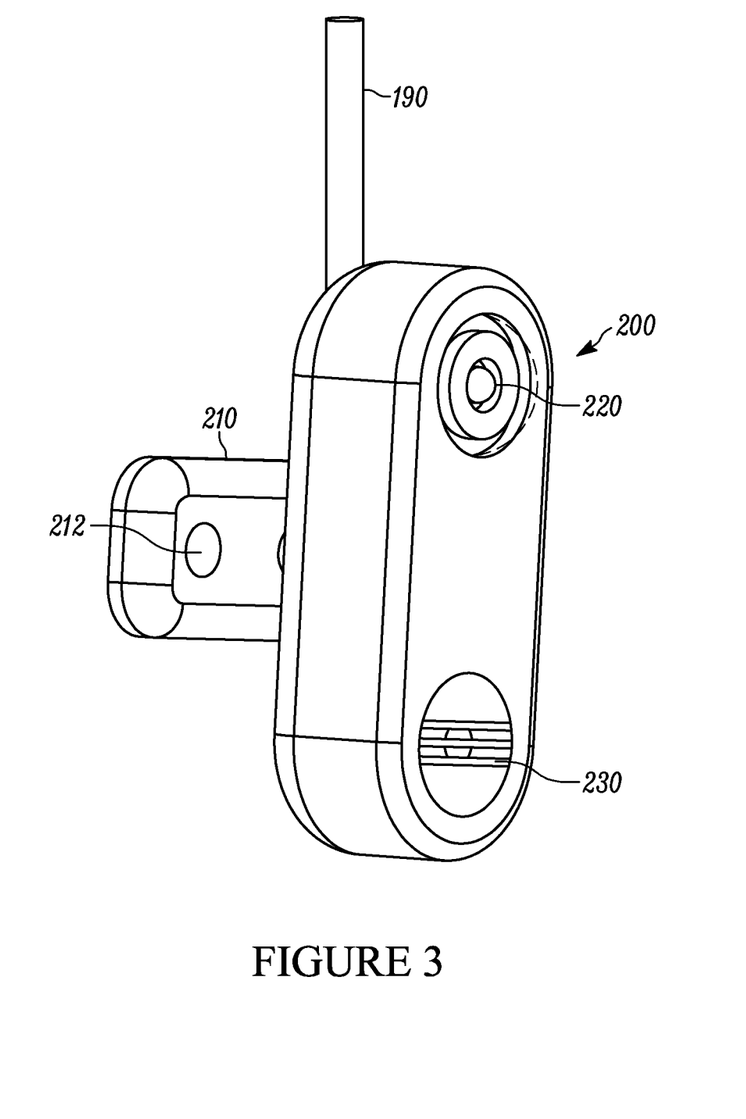
FIG. 3 shows an example of a light status detector used in connection with at least one embodiment of a barrier operator light-based security system.

FIG. 3 provides a more detailed view of the camera 200. The camera 200 includes a lens 220 for capturing images and/or video. The camera also includes a microphone 230 for capturing audio. The camera can be a micro camera or a camera of a relatively small size. In some embodiments the camera 200 may be equipped with other sensors or recording devices. For instance, the camera may be equipped with sensors, gauges, or other devices configured to capture the date, time, location, temperature, smoke or carbon monoxide levels, or other information.

The camera 200 may be equipped with communication capabilities (e.g., Bluetooth or Wi-Fi functionality) for transmitting captured images wirelessly to another component or device. Additionally and/or alternatively, the camera 200 can be connected to other components of the system 100 via a cord 190. The camera can mount to a location in a building (e.g., to a ceiling of a garage), via a mounting mechanism 210. For instance, the mounting mechanism 210 may allow the camera to be mounted to a wall or ceiling by inserting a nail or screw through one or more screw holes 212 on the mounting mechanism 210. In some examples, the camera 200 can mount to, or be a part of the movable barrier operator 10. Additionally and/or alternatively, the camera can be a component of a light source or light bulb. In another example, the camera can be mountable within a light socket in a building or garage, including, for example, the light socket for the operator light 50 of the movable barrier operator 10. By still a further example, the camera 200 can be a component of the light status detector 150.

Referring back to FIG. 2, the camera 200 is connected, via cord 190, to a power supply 130. Here, the power supply 130 is an AC power adaptor, shown plugged into a 120 V power supply in the ceiling of the garage. The power supply 130 can transmit electrical power the camera 200, thereby enabling operation of the camera 200.

The system 100 can also include a communication module 140, or wireless transmitter, in communication with the camera 200 and the light status detector 150. Optionally, the power supply 130 itself may include, or operate as, a wireless transmitter for transmitting security data captured by the camera 200 and/or microphone 230. In such a configuration, the camera 200 and/or microphone 230 will transmit the security data over the cord 190 for transmission by the power supply 130 and/or communication module 140.

Figure 4:
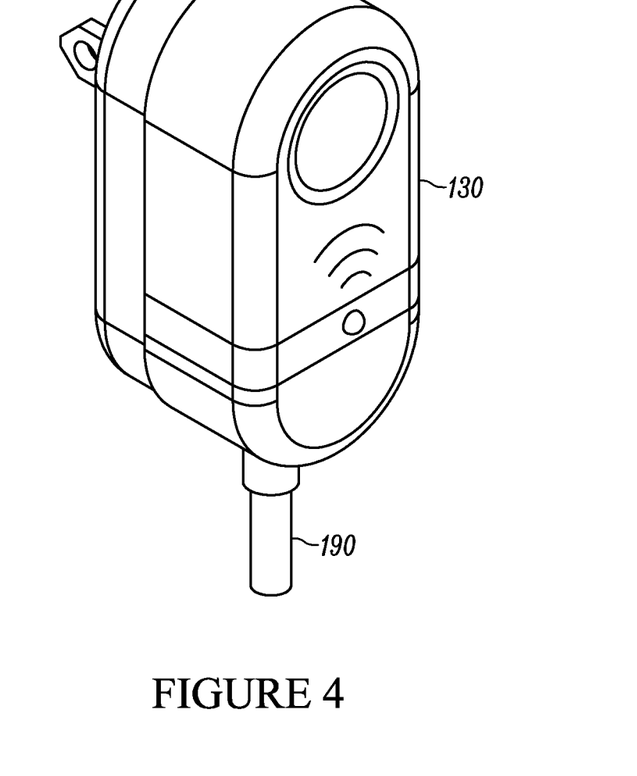
FIG. 4 shows an example of a camera used in connection with at least one embodiment of a barrier operator light-based security system.

FIG. 4 provides a more detailed view of an example of a power supply 130. In this configuration, the power supply 130 also includes—or operates as—both the control circuitry 120 and the communication module 140, which are not separately identifiable in the Figures.

The communication module 140 can be a wireless transceiver that is in communication with the camera and the light status detector 150. The wireless transceiver 140 can be configured to communicate with one or more remote devices (e.g., a smart phone, a wireless network hub, or other wireless communication device) via a wireless signal.

In operation, the wireless transceiver 140 can receive a signal from the light status detector 150 (e.g., through the transmitter of the light status detector) regarding the status of the operator light 50 (i.e., whether the operator light is on or off). Based on the status of the operator light 50 (e.g., the operator light is determined to have been turned on), the security system 100 initiates a control to operate the camera 200 to capture security data. The wireless transceiver 140 can then transmit the captured security data to a remote device, such as a mobile device 320 or a computer. For instance, when the system 100 detects that the operator light 50 has turned on, the system 100 responsively operates the camera 200 to obtain security data, and the system 100 transmits the obtained data to a remote device, such as a user's smart phone.

In some embodiments, the wireless transceiver 140 itself can be configured to operate the camera 200 to obtain security data in response to receipt of a signal from the light status detector 150 that the operator light 50 is on. In some embodiments, the wireless transceiver 140 can be integrated into the camera, the cord 190, or another component of the security system 100. The wireless transceiver 140 could also, by some approaches, be mountable to, or an integral component of a movable barrier operator 10. For example, the movable barrier operator 10 could be capable of communicating and/or operating by way of WiFi, wherein the WiFi communication functionality is provided by way of the wireless transceiver 140.

FIG. 2 also shows a cable manager 180 positioned between the camera 200 and the power supply 130 as a part of cord 190. The cable manager 180 (or a cable management system) manages slack in the cord 190 between the power supply 130 and the camera 200. For instance, the cable manager 180 can be spring loaded and used to minimize, reduce, or otherwise manage slack in the cable between the camera and the power adapter.

Figure 5:
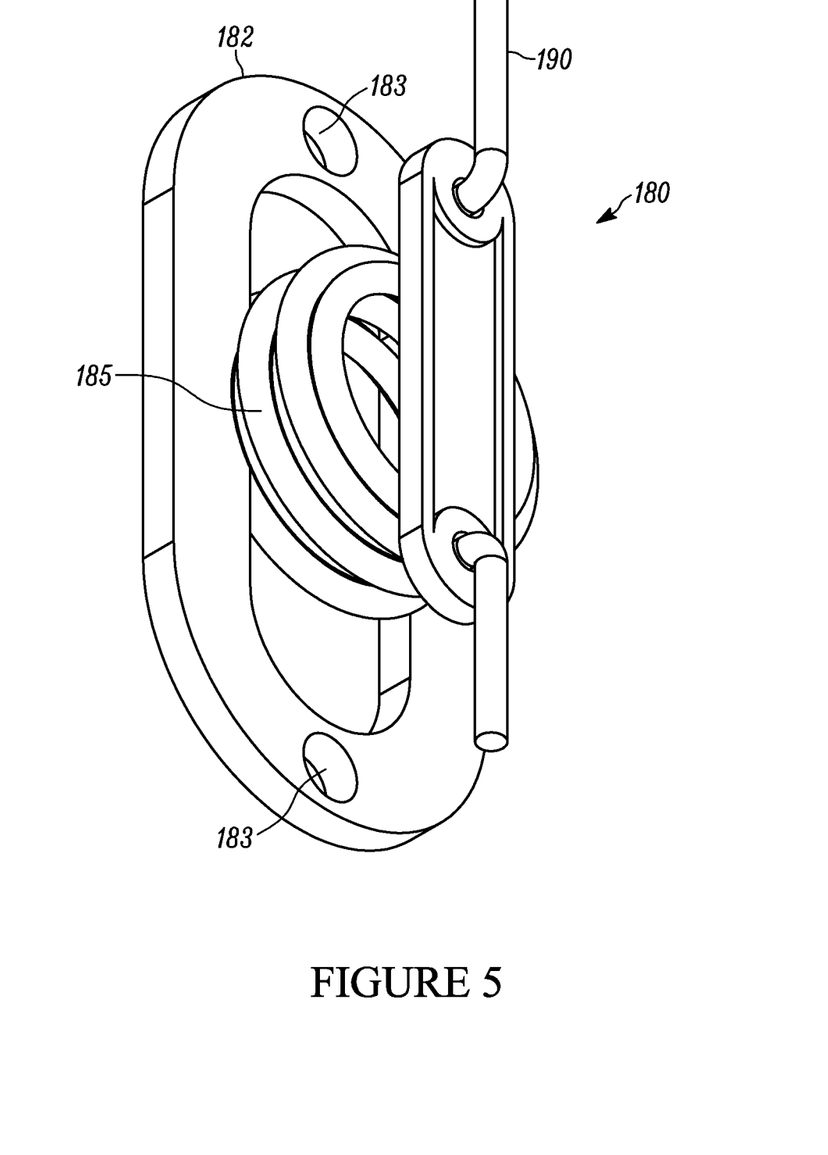
FIG. 5 shows an example of a cable manager used in connection with at least one embodiment of a barrier operator light-based security system.

FIG. 5 provides a more detailed view of the cable manager 180. A mounting plate 182 with two screw holes 183 provides for the mounting of the cable manager to a wall or ceiling. The cable manager 180 is configured to wind excess slack around a spool 185, thereby forming a coil of wound cable 190 around the cable manager 180. The spool 185 can be configured with a winding device (e.g., a handle or grip) that facilitates winding of the excess cable 190 slack around the spool 185. In some examples, the cable manager 180 is equipped with a spring loaded mechanism to facilitate automatic rotation of the spool 185, and thus winding of the cable 190 around the spool 185. In some embodiments, the communication module 140 and/or the wireless transceiver can be integrated into integrated into the cable manager 180.

The system 100 of FIG. 2 also includes a light status detector 150 configured to detect the status of the operator light. For instance, the light status detector 150 determines when the operator light 50 of the movable barrier operator 10 has been turned on (or was intended to be turned).

In some examples, the light status detector 150 can include a light sensor that detects light generated by the operator light. For example, the light status detector 150 can include a light or optical sensor that is configured to detect light specifically generated by the operator light 50. In this manner the light sensor can be installed in a garage in a location on or around the operator light 50 of the movable barrier operator 10.

In some aspects, the light sensor can be installed in the camera 200, the cable manager 180, or the power adapter 130. For instance, the power supply 130 can be plugged into the same power outlet set as the movable barrier operator 10 such that the operator's lighting status will be readily sensed by the light sensor on the power supply 130. In another example, the camera 200 itself can act as the light sensor where a processing device in communication with the camera 200 can analyze the light captured by the camera 200 to determine if it corresponds to a change in lighting state by the movable barrier operator 10, which may occur, for example, via the movement of the barrier.

The light sensor can also be configured to detect an immediate change in the intensity of light. This can allow the light sensor to distinguish between the operator light turning on and a gradual increase in light in the garage over the course of a day. In some examples, the light sensor is configured to detect the status of the operator light 50 in both dark (i.e., night time) conditions and light (i.e., day time) conditions.

The light sensor can also be configured to distinguish between the operator light 50 being turned on and another light in close proximity (e.g., in the same garage) turning on. For example, the light sensor can be configured to distinguish between the operator light 50 and a car's headlights or other overhead lights in the garage. In this manner, the light sensor may be installed in close proximity to the operator light 50 itself.

In addition to or in lieu of this approach, the light sensor can be configured to detect a change in light based on an open or closed status of the barrier/garage door itself, which can be useful, for example, in a situation where the garage door operator's light malfunctions while the operator is still able to open and close the garage door.

In some examples, the light status detector 150 includes a socket relay, as opposed, or in addition, to the light sensor. The socket relay can be configured to be installed in a movable barrier operator 10 as shown in FIG. 2. The socket relay can be adapted to receive a light bulb that operates as the operator light 50. In this manner, the socket relay can be in electrical communication with the operator light 50, and used to determine when the operator light 50 has turned on. Further, such a configuration will allow the light status detector 150 to determine if the operator light 50 was intended to turn on even if the operator light does not effectively turn on, for example, in situations where the light bulb itself is broken or missing. In such a situation, the light status detector 150 installed in the socket relay will detect and consider the light to have been turned on.

In some aspects, the light status detector 150 includes a transmitter that communicates the status of the operator light 50 to other components including the camera 200, the movable barrier operator 10, and the power supply 130/ communication module 140. The transmitter can communicate via a wired or wireless protocol. For example, the transmitter may communicate via Bluetooth, WiFi, radio signals, or the like.

In the embodiment shown in FIG. 2, the light status detector 150 is a socket relay installed into the light socket of the movable barrier operator 10. That is, the light status detector 150 is installed into the socket where the operator light 50 would otherwise be installed. The operator light 50 itself is thereby installed within a socket receiving portion in the socket relay. In this manner, the socket relay provides electrical power from the movable barrier operator 10 to the operator light 50 so that the operator light 50 can effectively operate in the same manner as it otherwise would without the socket relay. This configuration allows the socket relay to determine when the movable barrier operator 10 has turned on (or intended to turn on) the operator light.

The light status detector 150 shown in FIG. 2 does not have a wired connection to the other components of the system 100. Accordingly, in this configuration, the light status detector 150 may utilize a wireless transmitter to communicate with the communication module 140 of the power supply 130. The transmitter can send a wireless signal that indicates that the light status detector 150 has detected that the operator light 50 has been turned on.

Figure 6:
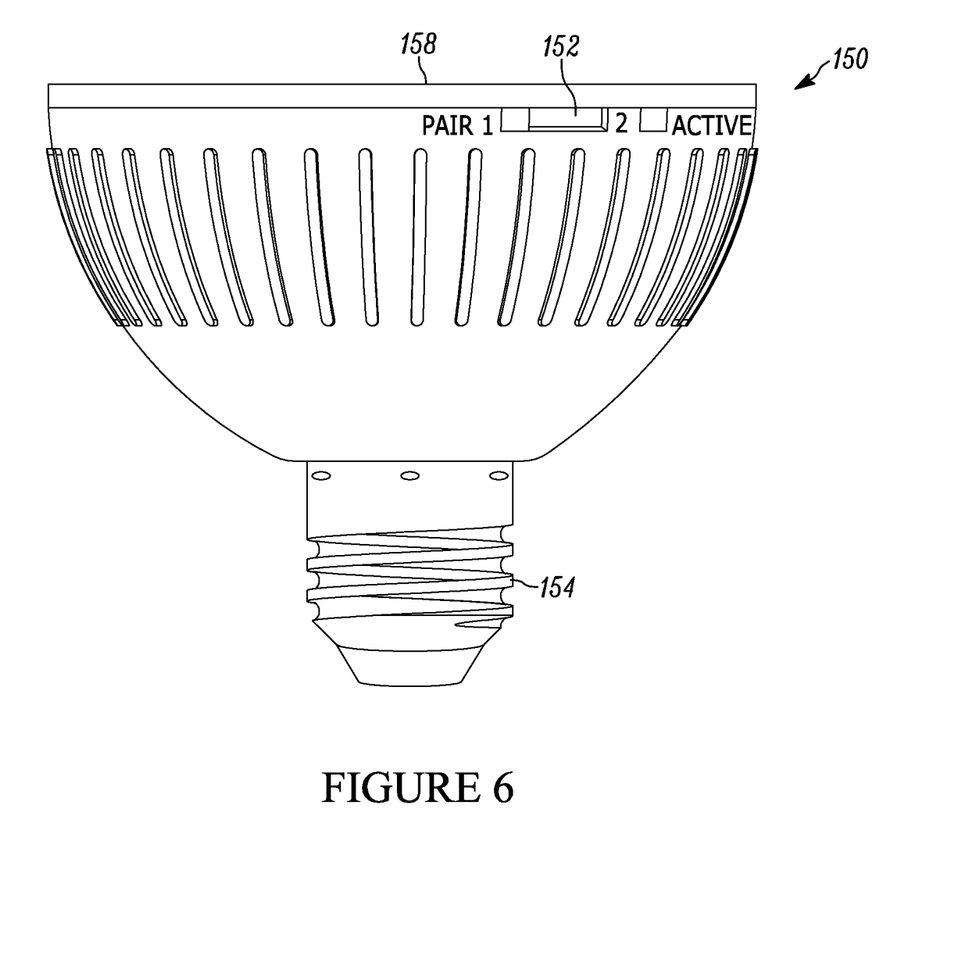
FIG. 6 shows an example of a power adaptor with a wireless communication module used in connection with at least one embodiment of a barrier operator light-based security system.

FIG. 6 provides a more detailed view of a light status detector 150 that includes a socket relay. The light status detector 150 includes a pairing mechanism 152, which facilitates communication between the light status detector 150 and other devices, including the communication module 140 of the system 100. For example, the pairing mechanism 152 can include a Bluetooth pairing device, which can allow the light status detector 150 to communicate with the communication module 140 of one, or even of a plurality of systems 100, using Bluetooth techniques.

The light status detector 150 also includes a socket install component 154, which is configured to install into a socket of the movable barrier operator 10. Via the socket install component 154, which can include a threaded portion, the light status detector 150 can screw into the socket of the movable barrier operator 10 in the same fashion as a typical light bulb. That is, the light status detector 150 can install into the same socket originally designed to receive the operator light 50. Through the socket install component 154, the socket relay can receive electrical power from the movable barrier operator 10, which electrical power can be used to power the light status detector 150 and its components (e.g., the transmitter, the detector circuitry, indicator lights, etc.).

Once installed into the movable barrier operator 10, the light status detector 150 can then receive the operator light 50 (e.g., a standard light bulb), via a socket receiving portion 158 on an upper surface of the socket relay, as shown more clearly in FIG. 2. The socket receiving portion 158 can have a similar or identical configuration to the original socket of the movable barrier operator 10, and is therefore configured to receive the operator light 50 in a similar manner as the movable barrier operator 10 receives the light status detector 150. Through this receiving portion 158, the light status detector can provide electrical power to the operator light 50. For example, the light status detector 150 can transmit electrical power received from the movable barrier operator 10 to the operator light 50, via the socket receiving portion.

As noted, when the light status detector 150 determines that the operator light 50 has turned on, or was intended to have been turned on, a signal is responsively sent to the communication module 140 and/or the control circuitry 120. In response to receiving this signal from the light status detector 150, the control circuitry 120 operates the camera 200 to capture security data. The communication module 140 of the power supply 130 can then transmit that security data and other communications over a network 300.

The movable barrier operator 10 can be, or can include, a motorized garage door operator installed in a garage. The security system 100 and/or the movable barrier operator 10 can also include various sensors and other equipment that can be used to provide added security. For instance, the security system/movable barrier operator can include a motion detector or motion detection system that can be installed in or around a garage. The motion detector generates a signal when it detects an object (e.g., a person, animal, car, bike, etc.) moving within the garage. In some aspects, the movable barrier operator is configured to turn the operator light on when motion is detected by the motion detector.

In some embodiments, the movable barrier operator 10 includes a safety beam sensor system 30 as generally known in the art. For example, the safety beam sensor 30 can utilize photo beams, laser beams, or time of flight to determine if an area monitored by a safety beam sensor system has been breached. The safety beam sensor 30 system can include two or more components installed on opposite sides of a building (e.g., garage) entryway. For instance, the safety beam sensor system 30 can have a first component that transmits a safety beam that can be a laser or other light beam in a horizontal direction across the opening of the entryway. A second component includes a receiver sensor that detects the safety beam and generates a signal back to the garage door operator. When the safety beam is broken (e.g., when an object gets in between the first and second safety beam sensors), the second component transmits a signal to the garage door operator. This signal represents that an object has crossed the threshold into or out of the building or garage. In another approach, the obstacle detector 30 may utilize time of flight techniques to determine whether an obstacle or other object has breached or crossed a threshold monitored by the obstacle detector 30. Other known obstacle detectors can be similarly included.

Some examples of a movable barrier operator 10 may be equipped with an operator light 50. The operator light 50 can be, for example, a light bulb installed in a light socket on a garage door operator. In some examples, the movable barrier operator 10 is configured to turn on the operator light 50 in response to the occurrence or detection of security certain events. For instance, the movable barrier operator 10 may turn on the operator light 50 in response to a barrier or garage door opening and/or closing (or the detection of such opening/closing).

The movable barrier operator 10 may also turn on the operator light 50 in response to the detection of an object moving within a building or garage (e.g., when a motion detector detects an object moving in a garage). The movable barrier operator 10 may also turn on the operator light 50 when it detects that an object or person has entered into the building or garage (e.g., when the safety beam sensor system detects that the safety beam has been broken).

In some examples, the security system 100 will operate by determining when the operator light 50 is on, has been turned on (or was intended to be turned on, e.g., a signal was sent to turn on a bulb that has burned out). When the operator light 50 is on, or within a predetermined time period (e.g., 30 seconds) after the light has turned on, the system 100 will collect security data (e.g., visual images or photographs, video, audio, and/or combinations thereof) via the camera 200 and/or other equipment mounted in the building/garage. The security system 100 will then, via the communication module 140, transmit or otherwise communicate the captured security data through a network so that the data may be accessed by an end user (e.g., a homeowner), via a mobile device 320. For example, the security system may transmit the captured security data to a storage system 340 such as cloud-based storage account, a hard drive, or another memory device.

Figure 7:
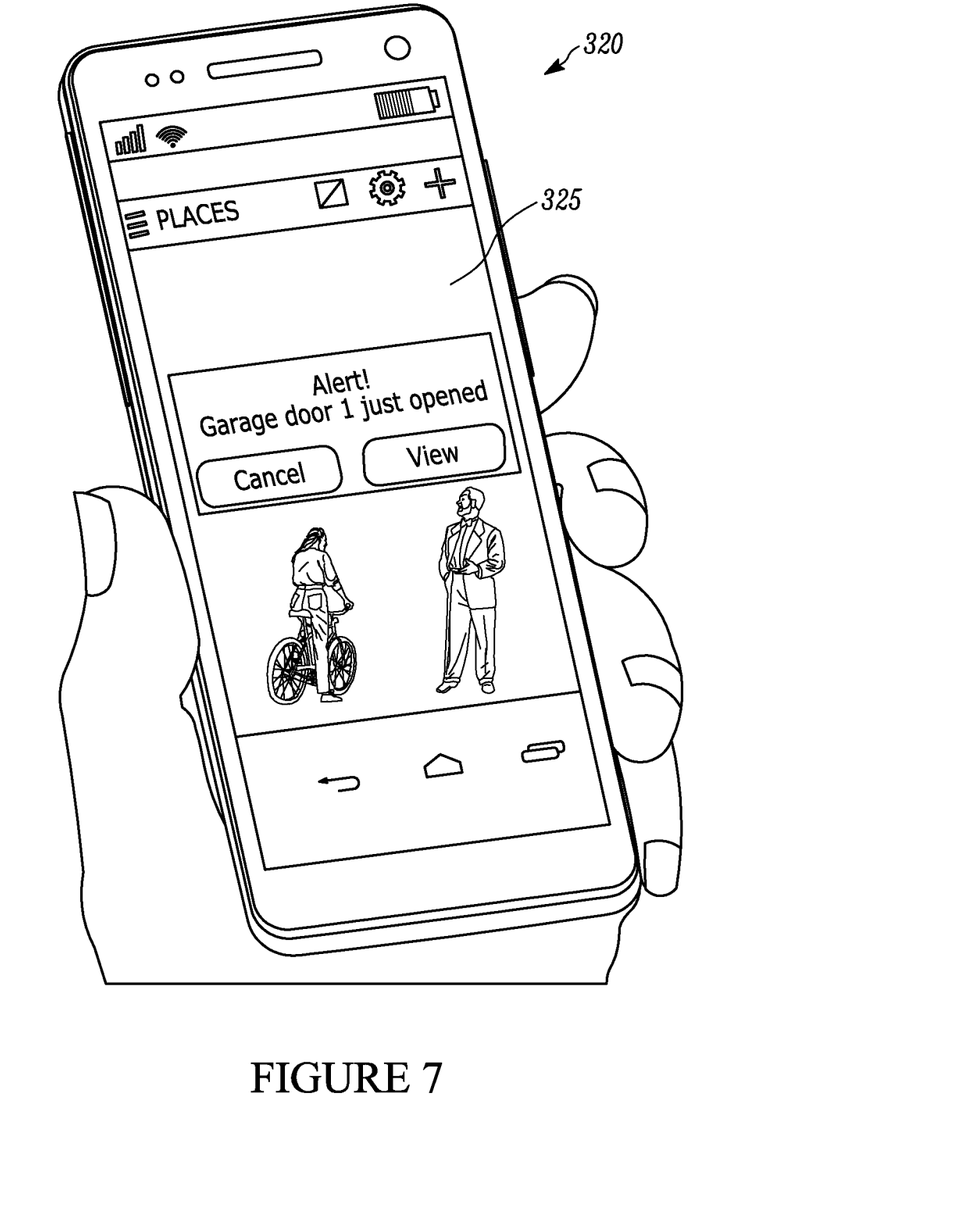
FIG. 7 shows a mobile device operating an example user interface used to interact with at least one embodiment of a barrier operator light-based security system.

The storage system 340 can be accessible by the user, for example, via a mobile device 320 operating a mobile application with a user interface 325. FIG. 7 provides an example of a mobile device 320—here, a smart phone—operating a mobile application. The mobile application can facilitate interaction with the security system 100. The mobile application provides a user interface 325 that can present alerts and notifications to the user. Upon receipt of these alerts, the user may access information, including security data captured by the camera 200 and other components of the security system 100, stored on the storage device.

In some examples, the security system 100 and/or the storage system 340 is configured to send notifications to the mobile device 320, and the user operating the mobile device can then access the contents of the storage device 340 including any recently recorded security data. For example, upon receipt of a notification, the mobile application may provide a user interface 325 that presents the user with an option to "view" security data. Upon selecting this option, the mobile application may proceed to download the related security data from the storage system 340. In this manner, the mobile application can present information for display on the user interface 325 including image files, video files, audio files, and the like.

The mobile application can be configured to generate a notification signal or transmit security data in response to receiving a signal indicating that the movable barrier operator 10 detects that the barrier (e.g., a garage door) has been opened, closed, or otherwise moved. Additionally and/or alternatively, the mobile application can be configured to generate a notification signal or to transmit security data in response to receiving a signal indicating the detection of motion within the garage, and/or that a safety beam generated about an entrance to the garage has been broken. For instance, the mobile application can issue alerts in the form of text and/or data messages to a mobile device 320, or sounds, ringtones, or alarms on the mobile device 320.

The mobile application can also facilitate generating or producing the security data (which may have been stored for later viewing) via the mobile device 320. For example, the mobile application can allow a user to view images or video obtained by the camera 200 and transmitted by the communication module 140. The mobile application can also allow the user to listen to audio obtained by the camera 200 and/or microphone 230. In some embodiments, the mobile application can allow a user to communicate with a garage or another structure via an intercom system installed on the movable barrier operator.

In other examples, the security system 100 and/or the storage device 340 is configured to automatically transmit the security data (directly or indirectly) to the mobile device 320. For instance, the security system and/or the storage device are configured to transmit a live video and/or audio feed to the mobile device in real time.

In some embodiments, the security system 100 can be configured to communicate with non-wireless devices, such as a desktop computer, a telephone, a television, a video display, or other devices.

Figure 8:
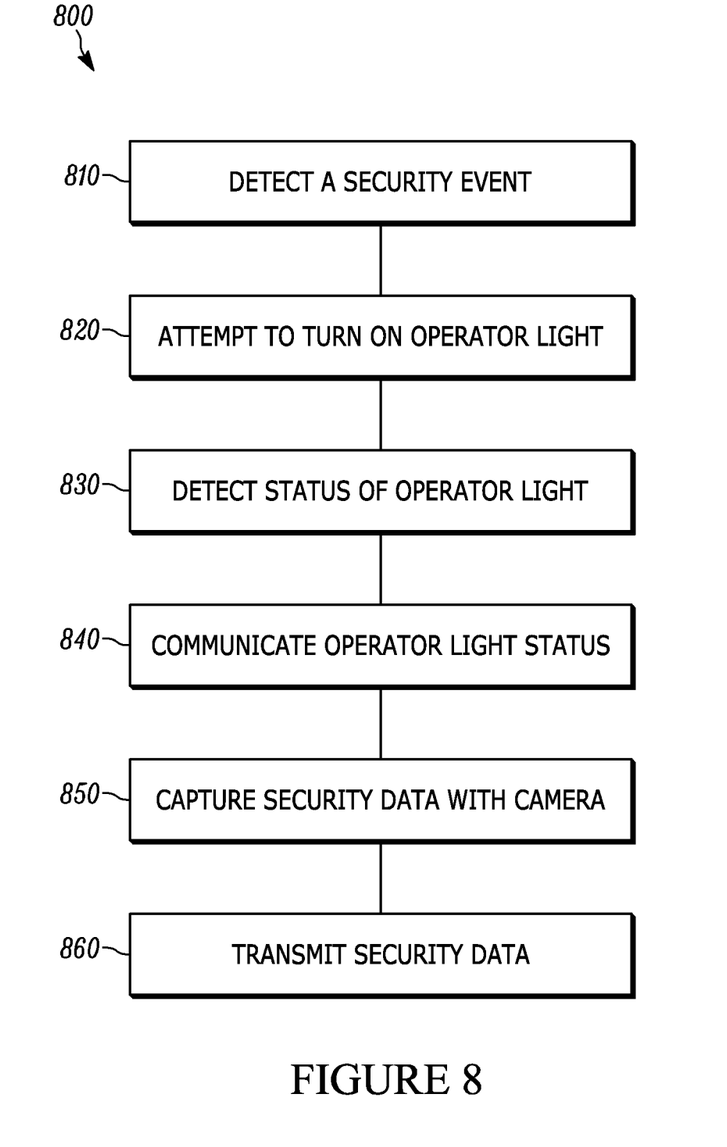
FIG. 8 is a flow diagram of an example method for monitoring security in a building or garage in accordance with one or more embodiments described herein.

Some examples describe a method for monitoring security in a garage or another building/structure. The method can involve using a security system (e.g., system 100) installed with respect to a building or garage having a movable barrier operator as described herein. FIG. 8 is a flow diagram showing steps of one example method 800 for monitoring security in a building (e.g., a garage).

The method 800 includes detecting 810 the occurrence of a security event within the garage, for example, with one or more components of a movable barrier operator system. For instance, the method 800 may detect 810 a security event by detecting when the movable barrier has opened, closed, or otherwise moved. The method 800 may also detect 810 a security event by detecting motion within the building with a motion detector or by detecting when someone or something has entered the building by breaking the security beam.

In response to detecting a security event, an operator light is attempted to be turned on 820. For example, the method 800 can include attempting to turn on 820 the operator light associated with the movable barrier operator when the movable barrier operator detects that a person or object has entered into or is moving within the garage. The method may also include turning on the operator light in response to the movable barrier operator's moving the barrier between open and closed positions (e.g., opening or closing a garage door).

The method 800 also involves detecting the status 830 of the operator light with a light status detector. For example, the light status detector can detect 830 whether the light is on or off by sensing the light generated by the operator light. Additionally and/or alternatively, the light status detector can detect 830 whether the light is on or off by detecting whether electrical power is delivered to the operator light (e.g., because the light status detector is in electrical communication with the operator light).

In some embodiments, the detected status of the operator light is communicated 840 to a communication module or wireless transceiver. For example, at step 840, a transmitter in the light status detector sends a signal (e.g., a wireless signal) communicating that the operator light has turned on.

Based on the detected status of the operator light, the system responsively operates a camera 850 to obtain security data. For example, when the light status detector communicates that the operator light is on, the camera is operated 850 to obtain security data such as visual images (i.e., photographs), video files, and/or audio files.

After collecting security data, the collected security data is transmitted 860 via the wireless transceiver to a remote wireless communication device, such as a smart phone operated by a user. The security data can be transmitted to a directly to a mobile device or to storage system accessible by the mobile device. In some examples, the method 800 also transmits notifications or alerts to a mobile device, whereby a mobile application operated by the mobile device facilitates user access to the captured security data via a user interface.

The present disclosure provides various examples and embodiments of security systems and/or components that operate in connection with a movable barrier operator. One particular example of a security apparatus will now be described.

The security apparatus is installable with respect to a movable barrier operator at a building entryway. The movable barrier operator has an operator light, and can include the various examples of movable barrier operators 10 described above with respect to FIGS. 1-6. The movable barrier operator is configured to move a barrier between an open and closed position, thereby closing off the entryway. For example, the movable barrier operator can be a garage door operator and the building can be a garage.

The example apparatus includes a camera configured to capture security data. The camera can be any of the examples of cameras 200 described above with respect to FIGS. 1-3. The camera can be mounted within the building, and can also be equipped with other sensors and/or recording equipment, such as a microphone to capture audio.

The example apparatus also includes a light status detector configured to detect an operating status of the operator light. The light status detector can include any of the examples of light status detectors 150 described above with respect to FIGS. 1-2 and 6. For example, the light status detector can include a light sensor that is configured to determine the status of the operator light based on the detection of light generated the operator light.

Additionally and/or alternatively, the light status detector can include a socket relay that is configured to be installed in, and receive electrical power from, the movable barrier operator. The socket relay receives the operator light and conducts electrical power from the movable barrier operator to the operator light. The socket relay includes a transmitter configured to communicate the operating status of the operator light to the communication module. The transmitter is configured to communicate with the communication module via a wireless communication protocol. For instance, the transmitter communicates a status that the operator light has turned on in response to the light status detector determining that the socket relay has provided power from the movable barrier operator to the operator light.

The example apparatus also includes a communication module configured to communicate with the camera and the light status detector. The communication module can be any of the examples of communication modules 140 or wireless transceivers described above with respect to FIGS. 1-2 and 5. The communication module can be incorporated into a power supply, such as an AC power adaptor or a battery unit. The communication module can be configured to communicate with a mobile device over a network, for example, through a network router.

Control circuitry is in communication with the communication module and the camera. The control circuitry can include any of the examples of control circuitry 120 described above with respect to the figures, or other forms of control circuitry. The control circuitry can be integrated into a single module, such as a power supply, or it may be incorporated across multiple components, including the camera, the communication module, the light status detector, and/or the power supply. The control circuitry is configured to control operation of the camera. For instance, the control circuitry can be configured to control the camera to capture security data, and also to adjust the orientation and other settings of the camera.

In operation, the system and/or the control circuitry are configured to operate the camera to capture security data in response to the light status detector determining that the operator light was turned on. That is, when the light status detector determines that the operator light has turned on, or was intended to have been turned on, the control circuitry effects the capture of security data by the camera.

Further, the communication module is configured to transmit the captured security data via the network. For instance, upon the capture of security data by the camera, the communication module transmits the captured security data over a network to a storage system, whereby a mobile device can access the security data, or to the mobile device itself.

The communication module may also be configured to send communications via the network, to and receive communications from a mobile device operating a mobile application with a user interface. For instance, the communication module may be configured to communicate information in a format such that the mobile device can display the captured security data via the user interface. The control circuitry may also be configured to effect the communication of notification information from the communication module to the mobile device in response to the light status detector determining that the operator light has turned on. The notification information can be configured to effect the mobile application to generate a notification on the mobile device upon receipt of the notification information.

The movable barrier operator can control the status of the operator light based upon an operating mode of the movable barrier operator. In this manner, the light status detector can be configured to detect the operating status of the operator light based at least in part on the operating mode of the movable barrier operator. For instance, the light status detector may be configured to detect the movable barrier operator attempting to turn the operator light on in response to the occurrence of a number of events. The events may include a barrier operated by the movable barrier operator opening or closing. The events may further include the movable barrier operator detecting motion within a proximity of the movable barrier operator. The events may also include the movable barrier operator detecting that a safety beam installed about the building entryway has been broken.

The example apparatus may further include a power adapter configured to connect to a power source and to provide electrical power to the camera via a cord. In certain aspects, the communication module and the control circuitry will be integrated into the power adaptor. In still other aspects, the apparatus will include comprising a cable manager that manages slack in the cord between the camera and the power adapter.

The example apparatus may include one or more additional (or second) cameras. The second cameras can be installed in various locations in, on, or around a building or garage. For example, one second camera can be installed in a garage, and another second camera (or third camera) may be installed near the front door to a home associated with the garage. In some aspects, some or all of the second cameras are also in communication with the control circuitry so that the control circuitry can control operation of each second camera. The control circuitry can be configured operate the second camera to capture security data in response to a variety of different events, including the light status detector determining that the operator light was intended to be turned on. Additionally and/or alternatively, the control circuitry can be configured to operate the second cameras in response to different events separate from the status of the operator light. For example, the control circuitry can be configured to operate one or more second cameras in response to the movable barrier operator, or sensors/detectors associated with the movable barrier operator, detecting certain security events. The security events can include, for example, detecting motion within the garage or about a building entryway, a photo beam detector detecting that a photo beam has been broken (e.g., signifying that an entryway has been breached), or a noise sensor (e.g., a glass-break detector) detecting a sound at or above a threshold level. The movable barrier operator is thus configured to transmit a security signal to the communication module of the security system. In response to the communication module receiving the security signal, the security system and/or control circuitry will operate one or more of the second cameras to capture security data.

The present disclosure makes reference to actions, events, controls, and other functionality that pertains to the control of a light (e.g., an operator light). For example, the present disclosure makes reference to components or methods that involve turning a light on or off. It should be understood that references to "turning on" or "turning off" a light includes attempts or intentions to turn a light on or off, regardless of whether such attempts or intentions are successful. That is, an attempt to turn an operator light on that fails as a result of a faulty light bulb, a missing light bulb, faulty circuitry, a power outage, errors in a communication system, or the like, are considered the same as actually turning an operator light on for purposes of this disclosure.

The present disclosure describes preferred embodiments and examples of a movable barrier operator/security system, and related components and methods of operation. Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. In addition, it should also be understood that features of one embodiment may be combined with features of other embodiments to provide yet other embodiments as desired. All references cited or discussed in the present disclosure are hereby incorporated by reference in their entirety.

The invention claimed is:

1. A security apparatus installable with respect to a movable barrier operator at a building entryway, the movable barrier operator having an operator light, the apparatus comprising:
   a camera configured to capture security data;
   a light status detector configured to detect an attempt by the movable barrier operator to turn on the operator light regardless of whether the operator light turns on;
   a communication module configured to communicate with the camera and the light status detector, the communication module further configured to communicate over a network; and
   control circuitry in communication with the communication module and the camera,
      the control circuitry configured to control operation of the camera,
   wherein the control circuitry is configured to operate the camera to capture security data in response to the light status detector determining the attempt by the movable barrier operator to turn on the operator light regardless of whether the operator light turns on, and
   wherein the communication module is configured to transmit the captured security data via the network.

2. The apparatus of claim 1, wherein the light status detector comprises a light sensor configured to determine an operating status of the operator light based on the detection of light generated by the operator light.

3. The apparatus of claim 1, wherein the light status detector comprises a socket relay configured to be installed in, and to receive electrical power from, the movable barrier operator, the socket relay further configured to receive the operator light and to conduct electrical power from the movable barrier operator to the operator light; and
   wherein the light status detector detects the movable barrier operator attempting to turn on the operator light upon receipt by the socket relay of electrical power from the movable barrier operator.

4. The apparatus of claim 3, wherein the socket relay further comprises a transmitter configured to communicate the movable barrier operator attempting to turn on the operator light to the communication module.

5. The apparatus of claim 4, wherein the transmitter is configured to communicate with the communication module via a wireless communication protocol.

6. The apparatus of claim 4, wherein the transmitter is configured to communicate a status that the operator light has turned on in response to the light status detector determining that the socket relay has provided power from the movable barrier operator to the operator light.

7. The apparatus of claim 1, wherein the movable barrier operator controls an operating status of the operator light based upon an operating mode of the movable barrier operator, and wherein the light status detector is configured to detect the operating status of the operator light based at least in part on the operating mode of the movable barrier operator.

8. The apparatus of claim 7, wherein the light status detector is configured to detect the movable barrier operator attempting to turn on the operator light in response to the movable barrier operator operating mode indicating at least one of the following: a barrier operated by the movable barrier operator is moving; the movable barrier operator detected motion within a proximity of the movable barrier operator; or the movable barrier operator detected that a safety beam installed about the building entryway has been interrupted.

9. The apparatus of claim 1, wherein the communication module is configured to send communications to, and receive communications from, a mobile device operating a mobile application with a user interface via the network.

10. The apparatus of claim 9, wherein the communication module is configured to communicate information in a format so that the mobile device can display the captured security data via the user interface.

11. The apparatus of claim 10, wherein the control circuitry is configured to effect communication of notification information from the communication module to the mobile device in response to the light status detector determining that the movable barrier operator attempted to turn on the operator light, wherein the notification information is configured to effect the mobile application generating a notification upon receipt of the notification information by the mobile device.

12. The apparatus of claim 1, further comprising a power adapter configured to connect to a power source and to provide electrical power to the camera via a cord, wherein the communication module and the control circuitry are integrated into the power adapter.

13. The apparatus of claim 12, further comprising a cable manager configured to manage slack in the cord between the camera and the power adapter.

14. The apparatus of claim 1, further comprising at least one second camera in communication with, and operably controlled by, the control circuitry.

15. The apparatus of claim 14, wherein the control circuitry is configured to operate the at least one second camera to capture security data in response to the communication module receiving a security signal from the movable barrier operator corresponding to the detection of a security event.

16. The apparatus of claim 15, wherein the movable barrier operator is configured to transmit the security signal in response to at least one of a motion detector detecting motion within the building, or a photo beam sensor installed in the building detects that a photo beam has been interrupted.

17. A security apparatus configured to operate with a garage door operator installed in a garage, the garage door operator having an operator light, the apparatus comprising:
   a camera configured to capture security data, the security data including at least one of a visual image, a video file, or an audio file;
   a light status detector configured to detect an attempt by the garage door operator to turn on the operator light regardless of whether the operator light turns on; and
   a wireless transceiver in communication with the camera and the light status detector, the wireless transceiver configured to communicate with one or more remote devices via a wireless signal;
   wherein the wireless transceiver is configured to receive a signal from the light status detector regarding the attempt by the garage door operator to turn on the operator light and, in response to a determination of the attempt by the garage door operator to turn on the operator light, to control operation of the camera to capture security data and to wirelessly transmit the captured security data to a remote device.

18. The apparatus of claim 17, wherein the light status detector comprises a socket relay installed in the garage door operator, the socket relay comprising a transmitter configured to communicate the attempt to turn on the operator light to the wireless transceiver.

19. The apparatus of claim 18, wherein the socket relay is installable in a light socket on the garage door operator, wherein the socket relay is configured to receive the operator light, to provide power to the operator light, and to detect the attempt to turn on the operator light.

20. The apparatus of claim 17, wherein the light status detector comprises a light sensor configured to determine a status of the operator light based on the detection of light generated by the operator light.

21. The apparatus of claim 17, wherein the garage door operator controls the status of the garage door operator light, and wherein the garage door operator attempts to turn the operator light on in response to at least one of the following:
 a door operated by the garage door operator opening or closing;
 the garage door operator detecting motion within the garage; and the garage door operator detecting that a safety beam installed about an entrance to the garage has been interrupted.

22. The apparatus of claim 17, further comprising a power adapter configured to connect to a power source and to provide electrical power to the camera, wherein the wireless transceiver is integrated into the power adapter.

23. A method for monitoring security in a garage, the garage equipped with a garage door and a garage door operator, the garage door operator having an operator light, the garage door operator configured to attempt to turn on the operator light in response to at least one of the garage door opening and/or closing, detecting motion within the garage, and an object breaking a safety beam generated about an entrance to the garage, the method comprising:
 detecting an occurrence of a security event with the garage door operator;
 the garage door operator attempting to turn on the operator light in response to the detection of the security event;
 detecting the garage door operator attempting to turn on the operator light with a light status detector regardless of whether the operator light turns on;
 communicating the detected attempting to turn on the operator light to a wireless transceiver;
 operating a camera to obtain security data based on the detected attempting to turn on the operator light, the security data comprising at least one of visual images, video files, and audio files; and
 transmitting security data via the wireless transceiver to a remote wireless communication device.

24. The apparatus of claim 1, wherein the light status detector is configured to detect the attempt by the movable barrier operator to turn on the operator light in response to a change in an operating mode of the movable barrier operator.

25. The apparatus of claim 17, wherein the light status detector is configured to detect the attempt by the garage door operator to turn on the operator light in response to a change in an operating mode of the garage door operator.

* * * * *